US006717682B2

(12) United States Patent
Kathman et al.

(10) Patent No.: US 6,717,682 B2
(45) Date of Patent: Apr. 6, 2004

(54) NON-ETALON WAVELENGTH LOCKING OPTICAL SUB-ASSEMBLY AND ASSOCIATED METHODS

(75) Inventors: Alan D. Kathman, Charlotte, NC (US); Robert Russell Boye, Charlotte, NC (US)

(73) Assignee: Digital Optics Corp., Charlotte, NC (US)

( * ) Notice: Subject to any disclaimer, the term of this patent is extended or adjusted under 35 U.S.C. 154(b) by 206 days.

(21) Appl. No.: 10/033,171

(22) Filed: Dec. 28, 2001

(65) Prior Publication Data

US 2003/0063290 A1 Apr. 3, 2003

Related U.S. Application Data

(60) Provisional application No. 60/325,541, filed on Oct. 1, 2001.

(51) Int. Cl.[7] .................................................. G01B 9/02
(52) U.S. Cl. ...................................................... 356/521
(58) Field of Search .............................. 356/521, 451, 356/450, 519; 372/32

(56) References Cited

U.S. PATENT DOCUMENTS 5,305,330 A * 4/1994 Rieder et al. .......... 372/29.021
5,387,974 A * 2/1995 Nakatani .................... 356/519

* cited by examiner

*Primary Examiner*—Samuel A. Turner
(74) *Attorney, Agent, or Firm*—Susan S. Morse (57) ABSTRACT

A wavelength detector includes an optical structure receiving an input beam, the optical structure outputting at least three wavelength dependent two-beam interference signals. Each wavelength dependent two-beam interference signal has a different phase offset. A detector receives the at least three wavelength dependent two-beam interference signals and outputs an electrical signal representative of each wavelength dependent two-beam interference. A processor receives the at least three electrical signals from the detector and generates a composite control signal. Alternatively, two of the three signals are periodic with respect to wavelength and the third signal is a reference signal. The two-beam interference signals may be created by providing patterned apertures in respective beam paths. Phase shifting interferometry techniques may be used to determine the wavelength from the periodic signals.

29 Claims, 6 Drawing Sheets

NON-ETALON WAVELENGTH LOCKING OPTICAL SUB-ASSEMBLY AND ASSOCIATED METHODS

CROSS REFERENCE TO RELATED APPLICATIONS

The present invention claims priority under 35 U.S.C. §119(e) to U.S. Provisional Application No. 60/325,541 entitled "Non-etalon Wavelength locking Optical Sub-assembly and Associated Methods" filed Oct. 1, 2001, the entire contents of which are hereby incorporated by reference for all purposes.

FIELD OF THE INVENTION

The present invention is directed to a tunable wavelength monitor/locker for use with more than one wavelength, more particularly to an non-etalon wavelength locker which can be placed in an optical path of an application beam or in an optical path of a monitor beam. More particularly, the non-etalon wavelength locker borrows from phase shifting interferometry to realize continuous operation, for example, using a patterned aperture to shift created interference patterns. A single patterned aperture used in conjunction with a reference signal may also simply replace an etalon in a conventional wavelength locker.

BACKGROUND OF THE INVENTION

Some radiation sources exhibit wavelength drift over time in excess of that tolerable for many applications. This drift becomes increasingly important as the lifetimes over which these radiation sources are to be deployed increases. Factors such as temperature, age, operating power level, etc., all affect the output wavelength. By monitoring at least one of the direction of the wavelength change, the degree of the change and the percentage of the light being radiated at the different wavelengths, any or all factors which may be causing this change can be modified in accordance with the monitored signal via a feedback loop to stabilize the wavelength of the radiation source. Preferably, both the power and the wavelength are monitored in accordance with known techniques.

Such monitoring and stabilizing systems typically involve using a unit which is external to the radiation source itself. Such external units include crystal gratings, fiber gratings, spectrometers, and Fabry-Perot etalons, both straight and inclined. The grating systems include relatively large control units external to the radiation source. While etalon-based systems offer a more compact solution, so far these etalons are still separate units which may become improperly aligned, either with photodetectors or with optical elements required to direct and control the light onto the photodetectors.

Etalons are very expensive, due to the tight requirements thereon to insure proper performance thereof. This expense is even further increased when the etalon is to be miniaturized. Thus, it would be advantageous to create a wavelength locker which did not rely on an etalon and which can provide continuous monitoring over an operational range.

SUMMARY OF THE INVENTION

The present invention is therefore directed to a wavelength monitor/locker which substantially overcomes one or more of the problems due to the limitations and disadvantages of the related art.

The present invention may be realized by providing a wavelength detector including an optical structure receiving an input beam, the optical structure outputs at least three wavelength dependent two-beam interference signals, each wavelength dependent two-beam interference signal having a different phase offset. A detector receives the at least three wavelength dependent two-beam interference signals and outputting an electrical signal representative of each wavelength dependent two-beam interference. A processor receives the at least three electrical signals from the detector and generating a composite control signal.

The processor may use phase shifting interferometric techniques to generate the composite control signal. The optical structure may include a patterned aperture introducing the phase difference between the wavelength dependent two-beam interference signals.

The present invention may also be realized by providing a wavelength detector including a partial reflector receiving a beam from a light source, a patterned aperture, and a retro-reflector. A first portion output from the partial reflector is directed to the patterned aperture and a second portion output from the partial reflector is directed to the retro-reflector. The retro-reflector directs the second portion to the patterned aperture such that the first portion and the second portion interfere. A detector receives interfering signals from the patterned aperture, the patterned aperture outputting at least two periodic signals offset from one another.

The present invention may also be realized by providing a wavelength monitor which monitors a wavelength of a beam, the wavelength monitor including a first detector, a second detector, a third detector, a first filter in an optical path upstream of the first detector, a second filter in an optical path upstream of the second detector, a third filter in an optical path upstream of the third detector, the first, second, and third filters having different filter properties from one another. An optical element directs at least a portion of the beam onto each of the first, second, and third detectors through the first, second and third filters, respectively. A processor receives outputs from the first, second and third detectors, and determines the wavelength of the beam.

At least one of the first, second, and third filters may be a patterned aperture receiving two beams incident thereon. Each of the first, second, and third filters may be a patterned aperture receiving two beams incident thereon, each patterned aperture being different from the others. Each patterned aperture may have the same basic pattern and is out of phase with each of the other patterned apertures. Each may be out of phase with another aperture by the same amount. Phase differences between patterned apertures may cover $2\pi$.

A wavelength monitor which monitors a wavelength of a beam, said wavelength monitor including a first detector receiving a first signal, a second detector receiving a second signal, and a third detector receiving a third signal. At least two of the first, second, and third signals are periodic with respect to wavelength and a set having a value for each of the first, second and third signals represents a unique wavelength within a continuous operational range.

An optical element directs at least a portion of the beam onto each of the first, second, and third detectors. A processor receives outputs from the first, second and third detectors, and determines the wavelength of the input beam.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

Figure 1A:
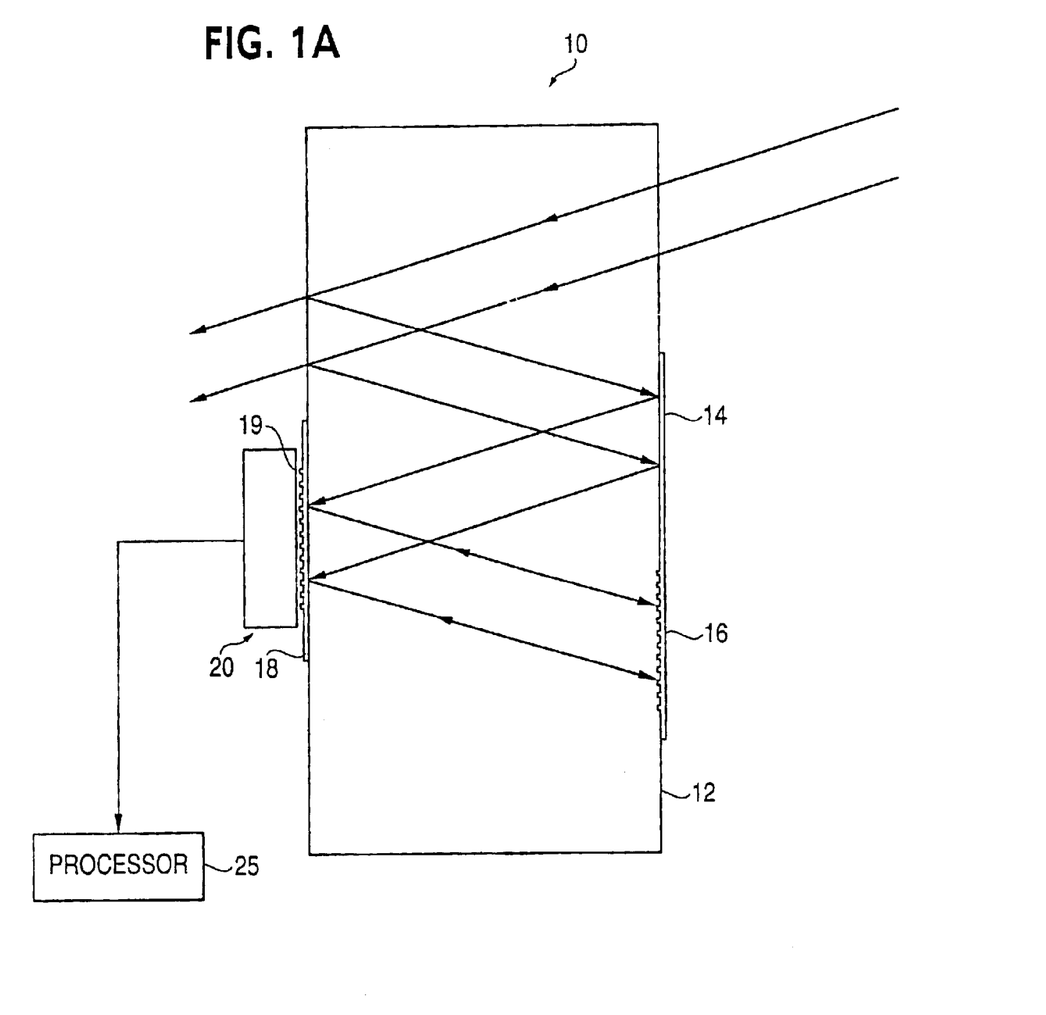
FIG. 1A is a cross-sectional view of an embodiment of the wavelength locker of the present invention.

FIG. 1A illustrates a cross-sectional view of the wavelength locker 10 of the present invention. The wavelength locker 10 includes a transparent substrate 12, a reflective portion 14, a retro-reflecting portion 16, a patterned aperture 18, a partially reflecting layer 19, and an array of detectors 20.

When a beam to be monitored enters the substrate 12 at an angle as shown in FIG. 1A, internal reflection upon the beam exiting the substrate 12 results in a portion of the beam being split off at an angle. An optical element may be provided at the output of the substrate 12 for operating on the primary beam. Also, if the beam is not collimated when it enters the substrate 12, the substrate 12 may include an optical element at the input for collimating the beam. Further, if the wavelength locker is used with a back facet, the application beam is not needed.

The monitor beam split off from the primary beam reflects off the reflective portion 14 towards the partially reflecting layer 19. Part of the light passes through the partially reflecting layer 19 to the patterned aperture 18 and then to the array of detectors 20. The rest of the beam is reflected from the partially reflecting layer 19 to the retro-reflector 16. The retro-reflector 16 reflects the beam back onto the partially reflecting film 19, where again part of the beam is passed through to the patterned aperture 18 and the array of detectors 20. Use of a diffraction grating as the retro-reflector 16 in such an arrangement is referred to as a Littrow grating.

The original beam impinging on the aperture 18 and the beam reflected back to the aperture 18 by the retro-reflector 16 interfere to create a periodic output, typically sinusoidal, on a detector 20, due to the phase shift between the two beams. The aperture 18 is preferably divided into at least three regions which are offset relative to one another, resulting in shifted periodic outputs from the detector. These offset periodic outputs are supplied to a processor 25 for monitor and/or control of the wavelength of a light source, as discussed below.

Figure 1B:
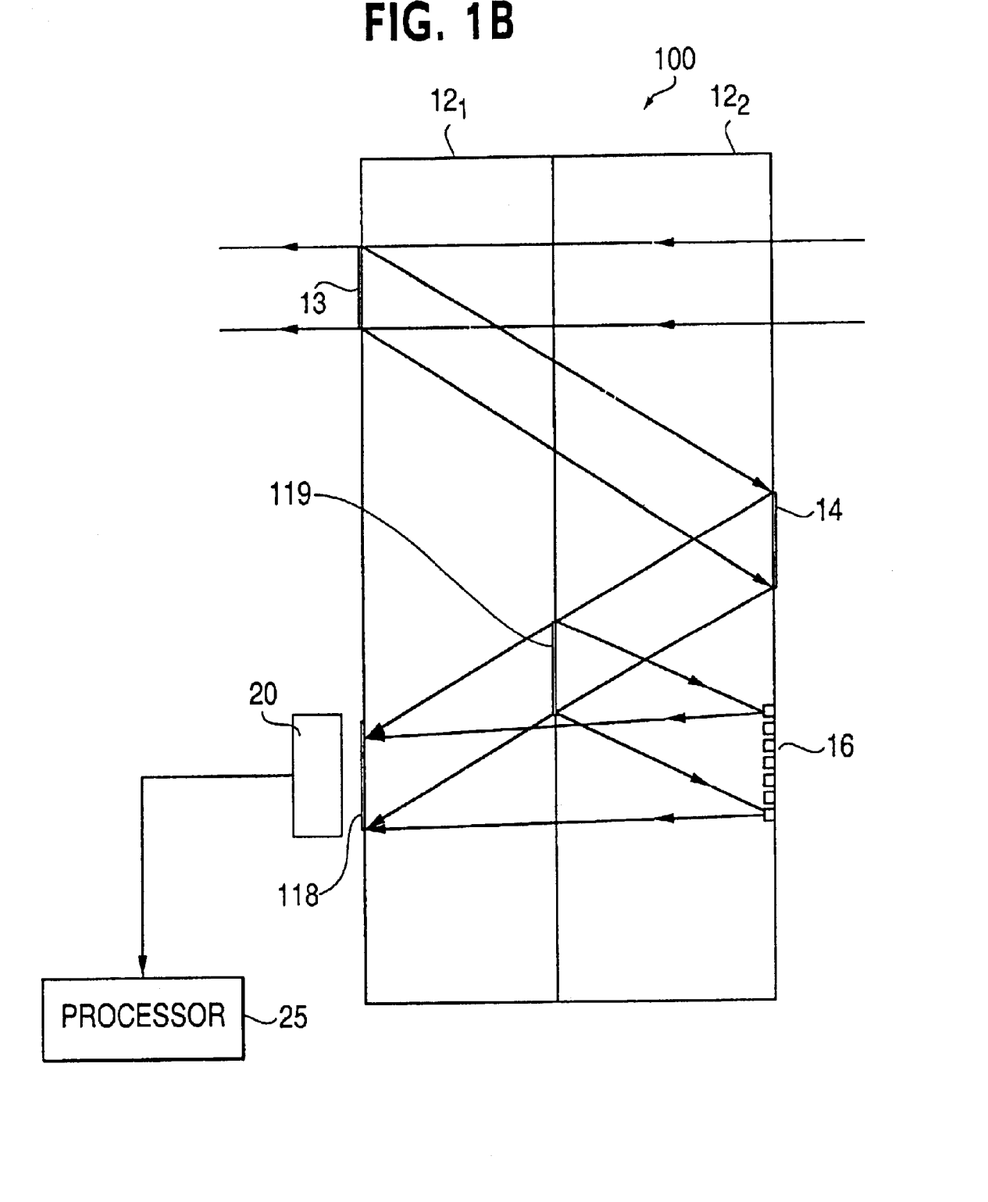
FIG. 1B is a cross-sectional view of another embodiment of the wavelength locker of the present invention.

An alternative embodiment of a wavelength locker 100 is shown in FIG. 1B. Here, the light beam enters the substrate at a normal incidence. A splitter 13, e.g., a diffractive optical element splitter, is provided on any of the surfaces of substrate 12, here shown on the output side. In the configuration shown in FIG. 1B, the substrate 12 includes two substrates $12_1$ and $12_2$ in order to allow provision of a partial reflector 119 separate from the aperture 118. The configuration in FIG. 1A may include two substrates or the configuration in FIG. 1B may include one substrate, with the partial reflector and the aperture being integrated as in FIG. 1A. As shown in FIG. 1B, the two substrates are of the same material.

As in FIG. 1A, the original beam incident on the aperture and the beam retro-reflected back onto the aperture 118 interfere to produce offset periodic signals at the detectors to be supplied to the processor 25.

Figure 1C:
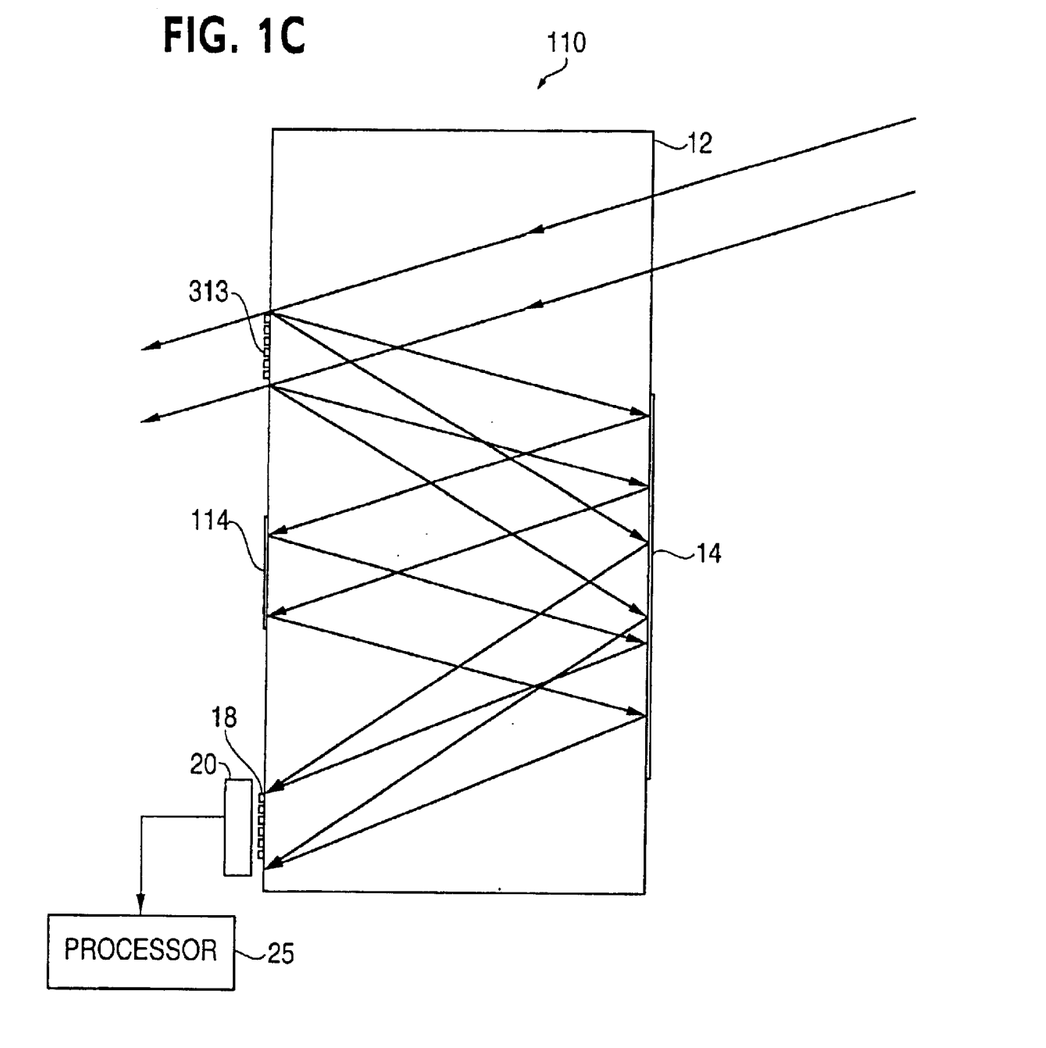
FIG. 1C is a cross-sectional view of yet another embodiment of the wavelength locker of the present invention.

Yet another alternative embodiment of a wavelength locker 110 is shown in FIG. 1C. Here, the light beam enters at an angle and encounters a diffractive splitter 313 which directs the light at two angles, here shown as θ and 2θ, creating two separate beams. Both beams are incident on the reflector 14. The beam at the steeper angle is reflected by the reflector 14 onto the patterned aperture 18. The beam at the shallower angle is reflected by the reflector 14 onto another reflector 114, which returns this beam to the reflector 14, which then directs the beam at the shallower angle onto the patterned aperture. Again, due to the difference in path length traveled, the two beams incident on the patterned aperture 18 will be out of phase and form an interference pattern which is then detected by the detectors 20.

Figure 2:
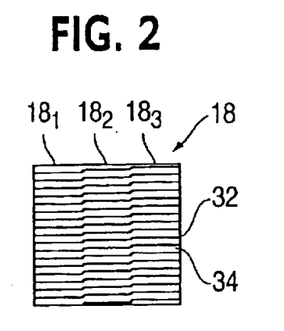
FIG. 2 is a top view of a patterned aperture for use with the wavelength locker of FIGS. 1A–1C.
Figure 3:
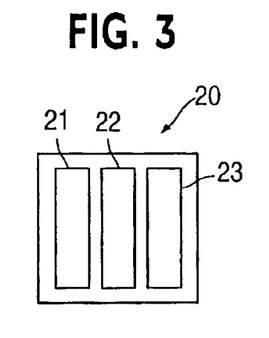
FIG. 3 is a top view of a three cell detector for use with the wavelength locker of FIGS. 1A–1C.

As can be seen in FIG. 2, the patterned aperture 18 may include three patterned regions $18_1$–$18_3$ offset relative to one another. The patterned regions shown include alternating black or opaque regions 32 and white or transparent regions 34. Each of the patterned regions $18_1$–$18_3$ correspond to a respective detector 21–23 in the detector array 20 shown in FIG. 3. While three patterned regions and three detectors are shown, the detector could include a single detection region and/or there may be more than three patterned regions.

Figure 4:
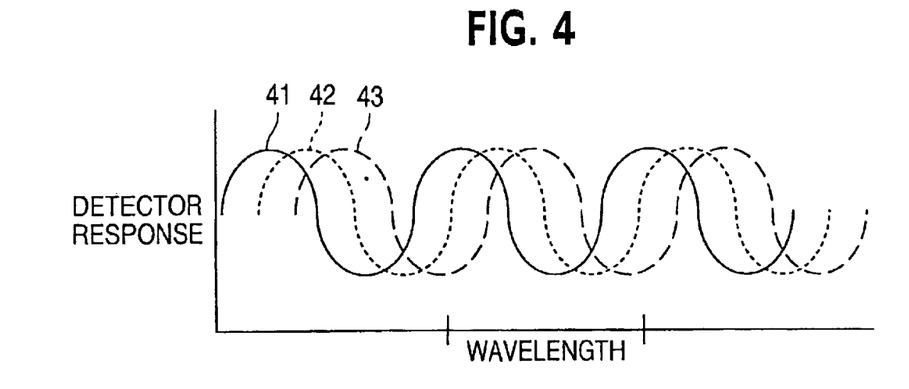
FIG. 4 is a representational output of the respective detectors for the different detectors of FIG. 3 when used with the aperture of FIG. 2.

The offset patterned apertures shown in FIG. 2 result in these interfering signals to be shifted relative to one another. This results in the outputs of the detectors of FIG. 3 as shown in FIG. 4, where the responses are sinusoidal and shifted. As is apparent from FIG. 4, throughout much of the response, both the function and its first derivative and smooth and continuously varying, i.e., a small shift in wavelength will produce a change in intensity for most wavelength values. However, where the slope of the curve approaches zero, this no longer holds true. This can be rectified by introducing either a linear reference signal or two other patterns which are shifted relative to one another so that at least one curve will have a sufficiently steep slope when slopes of other curves approaches zero. By using a reference signal, use of at least two offset patterned apertures will allow continuous operation. When using three periodic signals only, these signals just need to be shifted such that the slope for at least one of the signals is non-zero for every wavelength in the operational range. The system can be expanded to more than three aperture-detector pairs to reduce sensitivity to errors in the aperture and system noise.

When provided with three periodic signals, by using a phase shift in the reference leg, from interferometry techniques, a system of three equations and three unknowns can be generated. The sinusoidal signals produced by the offset patterned apertures mirror interferometer fringe intensities. The reference beam intensity can then be solved for, rather than monitored independently. The relevant equations for phase shifting interferometry are:

$$I_i(x,y)=I_R(x,y)+I'(x,y)\cos(\phi(x,y)+\beta_i) \quad (2)$$

where $I_i$ is the intensity for each beam, $I_R$ is the reference intensity, $I'$ is the intensity of the input beam, $\phi$ is the phase of the input beam, and $\beta_i$ is the reference beam phase for each patterned region, where $\beta_0=0$, $\beta_1=\pi/2$ and $\beta_2=\pi$.

Dropping the (x,y) position dependency for simplicity, the solutions for the three unknowns are:

$$I_R = \frac{I_0 + I_2}{2} \quad (3)$$

$$I' = 2\sqrt{(I_0-I_2)^2+(2I_1-I_0-I_2)^2} \quad (4)$$

$$\phi = \arctan\left(\frac{I_2 - I_1}{I_0 - I_1}\right) \quad (5)$$

The above interferometric approach may be used whenever there are at least three signals having a periodic nature with respect to wavelength. As used herein, "periodic" does not mean strict repeatability, only that the signal is sufficiently repeatable to allow interferometric equations to be used. In order to insure accurate identification of the wavelength, the periodic signals should be spaced relative to one another such that their flatter portions do not all overlap, i.e., a set consisting of a value for each of the detectors will uniquely identify the wavelength in a given range. In other words, at any coordinate, at least one signal has a steep enough slope to allow a change in wavelength to be detected. The properties of the diffractive elements and the transmittance properties of materials used in the system will determine the operational wavelength range.

The continuous nature of the wavelength determination results in a configuration for which the elements do not have to be altered if there is a change in spacing between the wavelengths being used. Further, the above configuration does not rely on a reference beam to accurately determine the wavelength, also rendering the configuration easily adaptable to changing requirements. However, the longer the period, the worse the accuracy, since the more likely two signals are to be substantially flat over the same wavelength region. This may be compensated for by including more aperture regions, i.e. creating more shifted interference patterns. The shift introduced between the aperture regions may be the same or may have the same periodicity as channel spacing for a system in which the wavelength locker is to be used.

Figures 5, 6:
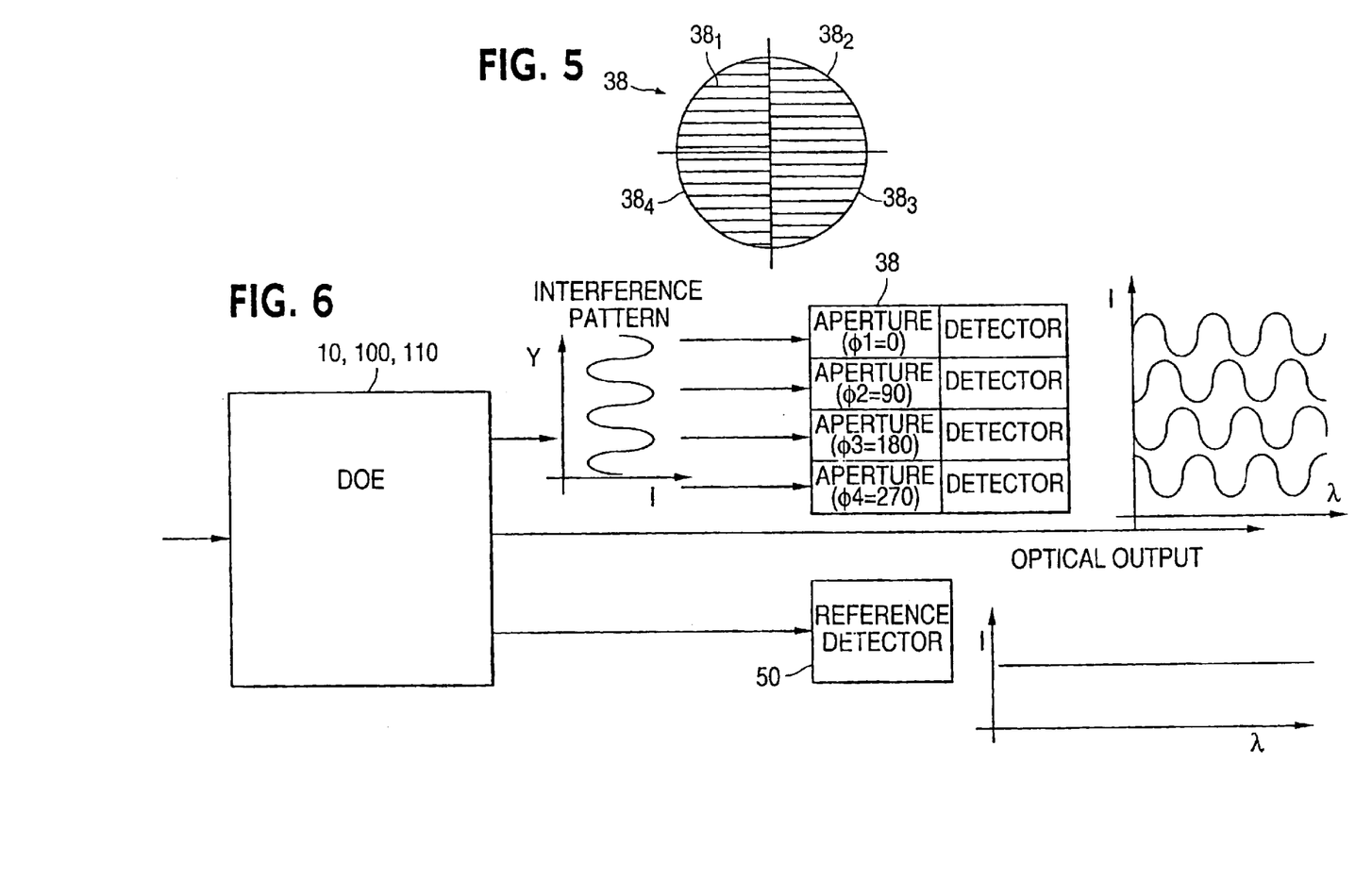
FIG. 5 is a top view of another patterned aperture for use with the wavelength locker of FIG. 1A or 1B.
FIG. 6 is a schematic view of outputs of a wavelength monitor system.

FIG. 5 illustrates another embodiment of a patterned aperture 38 in accordance with the present invention. Here, the aperture is divided into four regions $38_1$–$38_4$ which are offset relative to one another by $\pi/2$. The detector used in conjunction with this aperture 38 may be a quadrature detector. The processing is similar to that discussed above.

FIG. 6 is a schematic illustration of the wavelength locker using the aperture 38 shown in FIG. 5. As noted above, each detector now outputs a periodic signal phase shifted relative to one another. In FIG. 6, the configuration includes an optional reference detector 50 which may be used to further monitor the output power of the light source. The reference detector 50 is particularly useful when the light source is tunable. Further, when the reference detector 50 is used, only two periodic signals would be needed to determine the wavelength, with the reference detector 50 eliminating any remaining ambiguity.

Figure 7:
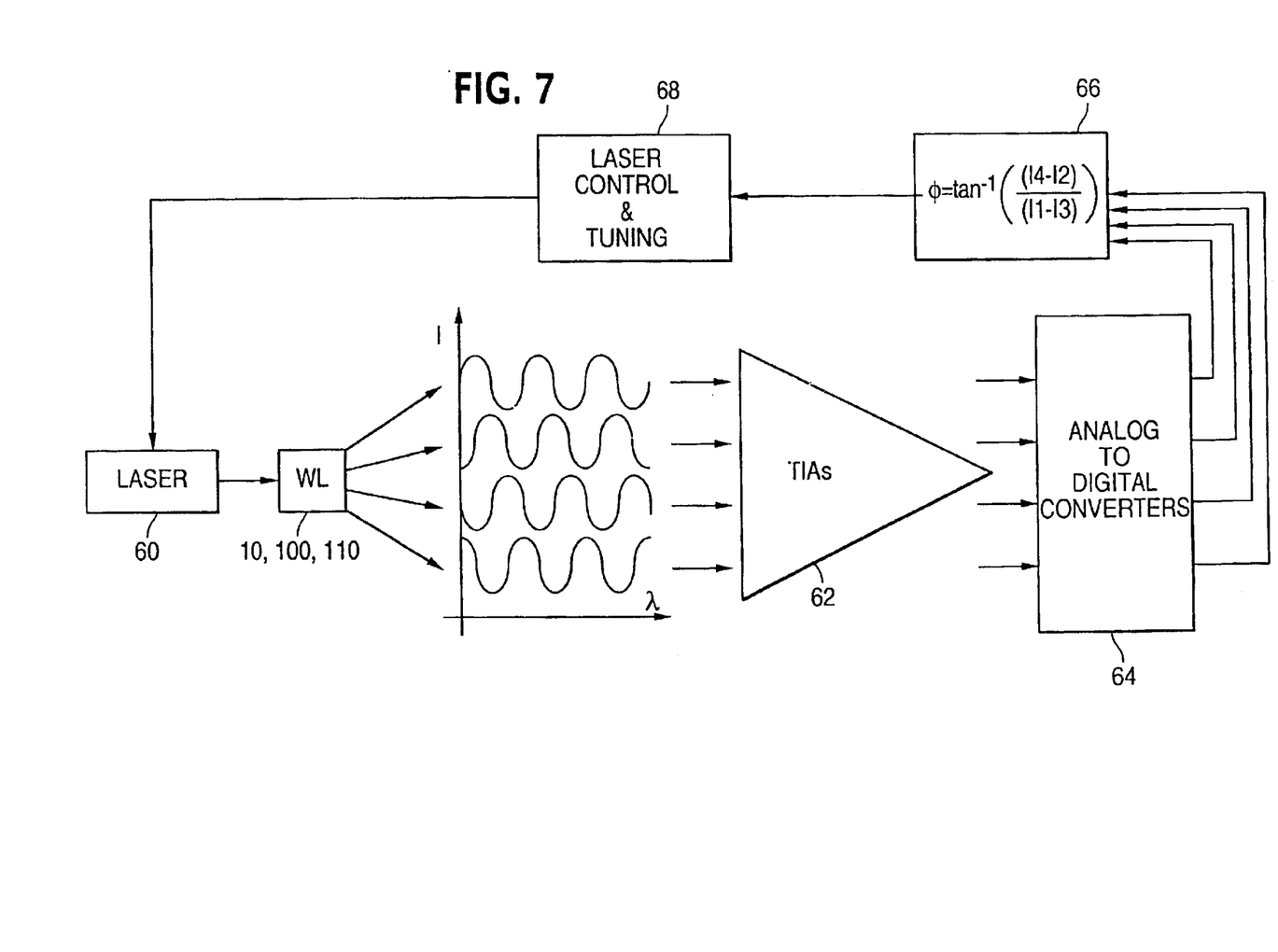
FIG. 7 is a schematic view of a wavelength locker system of the present invention.

FIG. 7 schematically illustrates the use of the wavelength locker for monitoring the wavelength of a light source 60, here a laser, being controlled using the wavelength locker of the present invention. In FIG. 7, the aperture 38 shown in FIG. 5 is used in the wavelength locker, which may be either of the configurations shown in FIGS. 1A–1C, or obvious variations thereof. The detector outputs, which are offset sinusoidal signals, are supplied to an amplifier 62, typically a trans-impedance amplifier (TIA). These amplified signals are output to an analog-to-digital converter 64, which then supplies the digital signals to a processor 66 which computes the wavelength from the four signals according to the equation:

$$\phi = \tan^{-1}\left(\frac{I_4 - I_2}{I_1 - I_3}\right) \quad (6)$$

This information is supplied to a laser control 68 that feeds back to and controls the output of the laser 60.

Thus, the present invention uses an optical structure to create two overlapping beams at an output plane. The overlapping beams create wavelength dependent two-beam interference at the output plane. This wavelength dependent two-beam interference creates a periodic signal that is more nearly sinusoidal with respect to wavelength than the typical etalon output. The important feature is not that the wavelength dependent signal is necessarily sinusoidal, but that a region over which a signal value does not represent a unique wavelength is reduced, i.e., regions where the slope of the signal with respect to wavelength is substantially zero, are reduced. This results in fewer unresolvable regions for each wavelength dependent two-beam interference as compared with the use of a costly etalon.

The present invention also uses the optical structure to create more than one wavelength dependent two-beam interference signal. By creating two or more such interference patterns with a phase difference between them, the unresolvable regions can be further reduced. These signals are detected and processed, e.g., using phase-shifting interferometry techniques, to determine the wavelength. In contrast to previous techniques, error signals for each output are not used to control the laser, but a single value representing a composite picture of the system from the wavelength dependent periodic signals is output, making the system of the present invention more robust than such previous solutions.

In the particular embodiments shown, the wavelength dependent two-beam interferences create a pattern in the output plane. This pattern is then sampled, here using apertures, at an appropriate offset so that each wavelength dependent interference detected has a different sampled phase.

In all of the configurations, the integrated wavelength locker is preferably formed on a wafer level, as set forth, for example, in commonly assigned, co-pending application Ser. No. 08/943,274, allowed, entitled "Wafer Level Integration of Multiple Optical Elements" which is hereby incorporated by reference in its entirety for all purposes. Preferably, a plurality of all the elements of the wavelength locker are bonded together at the wafer level and then diced to create the individual wavelength lockers. The material for the reflective portions is also preferably selectively deposited on a wafer level.

While the present invention is described herein with reference to illustrative embodiments for particular applications, it should be understood that the present invention is not limited thereto. For example, other techniques for creating wavelength dependent two-beam interference and offsetting two-beam interference signals relative to one another may be employed. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A wavelength detector comprising:
   an optical structure receiving an input beam, the optical structure outputting at least three wavelength dependent two-beam interference signals, each wavelength dependent two-beam interference signal having a different phase offset;
   a detector receiving the at least three wavelength dependent two-beam interference signals and outputting an electrical signal representative of each wavelength dependent two-beam interference; and
   a processor receiving the at least three electrical signals from the detector and generating a composite control signal.

2. The wavelength detector of claim 1, wherein the processor used phase shifting interferometric techniques to generate the composite control signal.

3. The wavelength detector of claim 1, wherein the optical structure comprises a patterned aperture introducing the phase difference between the wavelength dependent two-beam interference signals.

4. A wavelength detector comprising:
   a partial reflector receiving a beam from a light source;
   a patterned aperture;
   a retro-reflector, wherein a first portion output from the partial reflector is directed to the patterned aperture and a second portion output from the partial reflector is directed to the retro-reflector, the retro-reflector directing the second portion to the patterned aperture such that the first portion and the second portion interfere; and
   a detector receiving interfering signals from the patterned aperture, the patterned aperture outputting at least two periodic signals offset from one another.

5. The wavelength detector of claim 4, wherein the partial reflector and the patterned aperture are integral.

6. The wavelength detector of claim 4, further comprising a diffractive grating which deflects a portion of the beam into higher orders, one of said higher orders being incident on the partial reflector.

7. The wavelength detector of claim 4, wherein the partial reflector, the retroreflector and the patterned aperture are on a substrate.

8. The wavelength detector of claim 7, wherein the input beam is incident on the substrate at an angle.

9. The wavelength detector of claim 7, wherein the substrate includes more than one substrate bonded together.

10. The wavelength detector of claim 4, wherein the patterned aperture includes at least two sections having a same basic pattern, but being out of phase with one another.

11. The wavelength detector of claim 4, wherein the partial reflector, the patterned aperture and the retroreflector are bonded together on a wafer level and diced to form that portion of the wavelength locker.

12. The wavelength detector of claim 4, wherein said detector is an array of individual detectors.

13. The wavelength detector of claim 4, further comprising a reference detector receiving part of the beam.

14. The wavelength detector of claim 4, wherein all optical elements for providing the beams to the patterned aperture are on a single wafer or a wafer bonded thereto.

15. A wavelength monitor which monitors a wavelength of a beam, said wavelength monitor comprising:
   a first detector;
   a second detector;
   a third detector;
   a first filter in an optical path upstream of the first detector;
   a second filter in an optical path upstream of the second detector;
   a third filter in an optical path upstream of the third detector, the first, second, and third filters having different filter properties from one another;
   an optical element which directs at least a portion of the beam onto each of said first, second, and third detectors through said first, second and third filters, respectively; and,
   a processor receiving outputs from said first, second and third detectors, and determining the wavelength of the beam.

16. The wavelength monitor of claim 15, wherein at least one of said first, second, and third filters is a patterned aperture receiving two beams incident thereon.

17. The wavelength monitor of claim 15, wherein each of said first, second, and third filters is a patterned aperture receiving two beams incident thereon, each patterned aperture being different from the others.

18. The wavelength monitor of claim 16, wherein each patterned aperture has a same basic pattern and is out of phase with each of the other patterned apertures.

19. The wavelength monitor of claim 18, wherein each patterned aperture is out of phase with at least one of the other patterned apertures by a same amount.

20. The wavelength monitor of claim 16, wherein phase differences between patterned apertures cover $2\pi$.

21. The wavelength monitor of claim 15, wherein said first, second and third detectors are part of a single detector array.

22. The wavelength monitor of claim 15, wherein there is no reference detector.

23. The wavelength monitor of claim 15, wherein at least one of said first, second and third filters output a sinusoidal signal with respect to wavelength.

24. The wavelength monitor of claim 15, wherein each of said first, second and third filters output a sinuisoidal signal with respect to wavelength.

25. The wavelength monitor of claim 15, wherein one of said first, second and third filters outputs a linear signal.

26. A wavelength monitor which monitors a wavelength of a beam, said wavelength monitor comprising:
- a first detector receiving a first signal;
- a second detector receiving a second signal;
- a third detector receiving a third signal, wherein at least two of the first, second, and third signals are periodic with respect to wavelength and a set having a value for each of the first, second and third signals represents a unique wavelength within a continuous operational range;
- an optical element which directs at least a portion of the beam onto each of said first, second, and third detectors; and
- a processor receiving outputs from said first, second and third detectors, and determining the wavelength of the input beam.

27. The wavelength monitor of claim 26, wherein at least one of said first, second, and third signals is created using a patterned aperture having two beams incident thereon.

28. The wavelength monitor of claim 26, wherein each of said first, second, and third signals are created using different patterned apertures having two beams incident thereon.

29. The wavelength monitor of claim 28, wherein said different patterned apertures are a same basic pattern out of phase with one another.

* * * * *